United States Patent
Ahlers et al.

(10) Patent No.: US 7,361,130 B2
(45) Date of Patent: Apr. 22, 2008

(54) SYSTEM FOR PRODUCTION AND SUBSEQUENT PALLETIZING OF TUBE SEGMENTS, BAGS OR SACKS

(75) Inventors: Ralf Ahlers, Lengerich (DE); Hans-Dieter Welp, Lengerich (DE); Burkhard Schliek, Lengerich (DE)

(73) Assignee: Windmoeller and Hoelscher, Lengerich (DE)

( * ) Notice: Subject to any disclaimer, the term of this patent is extended or adjusted under 35 U.S.C. 154(b) by 253 days.

(21) Appl. No.: 11/120,197

(22) Filed: May 3, 2005

(65) Prior Publication Data
US 2006/0263194 A1 Nov. 23, 2006

(51) Int. Cl.
*B31C 1/00* (2006.01)

(52) U.S. Cl. .................. 493/269; 493/310; 414/788.1; 414/788.9

(58) Field of Classification Search ........... 493/269, 493/310; 414/28, 36, 48, 49, 52, 65, 80, 414/786, 758, 761, 762, 772, 788.1, 789.9; 271/185, 186, 210, 213, 221, 225; 198/403, 198/412
See application file for complete search history.

(56) References Cited

U.S. PATENT DOCUMENTS

| | | | | |
|---|---|---|---|---|
| 4,344,727 A | * | 8/1982 | Chaloupka | 414/789.1 |
| 4,526,501 A | * | 7/1985 | Blumle | 414/788.4 |
| 4,714,505 A | * | 12/1987 | Goodfellow et al. | 156/64 |
| 4,840,697 A | * | 6/1989 | Goodfellow et al. | 156/405.1 |
| 4,871,347 A | | 10/1989 | Brinkmeier | |
| 5,827,165 A | | 10/1998 | Achelpohl et al. | |
| 6,247,694 B1 | * | 6/2001 | Nonnemacher et al. | 271/146 |
| 6,511,281 B2 | * | 1/2003 | Graeler | 414/791.6 |

FOREIGN PATENT DOCUMENTS

| | | |
|---|---|---|
| DE | 3640219 C1 | 1/1988 |
| DE | 37 07 845 A1 | 9/1988 |
| DE | 44 40 660 A1 | 5/1996 |
| DE | 195 49 618 C2 | 9/2001 |
| EP | 0 711 724 A1 | 5/1996 |

* cited by examiner

*Primary Examiner*—Hemant M. Desai
(74) *Attorney, Agent, or Firm*—Jacobson Holman PLLC

(57) ABSTRACT

A system for the production and subsequent palletizing of tube segments, bags, or sacks has at least one functional unit for production of tube segments, bags, or sacks, at least one device for depositing and stacking, which places and stacks the finished tube segments, bags, or sacks, and at least one storage element such as a palette, in which the stack can be deposited. The system has at least one alignment unit for the stack of the tube segments, bags, or sacks, which reduces the mutual deviations of the edges of the tube segments, bags, or sacks.

16 Claims, 3 Drawing Sheets

SYSTEM FOR PRODUCTION AND SUBSEQUENT PALLETIZING OF TUBE SEGMENTS, BAGS OR SACKS

BACKGROUND OF THE INVENTION

1. Field of Invention

The invention relates to a system and a method for production and subsequent palletizing of tube segments, bags or sacks. The system includes at least one functional unit for the production of tube segments, bag or sacks, at least one device for depositing and stacking, which places and stacks the finished tube segments, bags or sacks, and at least one storage element such as a palette, in which the stack can be deposited.

2. Description of the Prior Art

These types of systems are known since a long time. Tube segments, bags or sacks are produced in general from single or multi-layered sheets of material in processing machines meant for it. To form the tube segments, devices of the type shown and described, for instance, in the patent document DE 36 40 219 C1 and in DE 44 40 660 C2, are used. Sacks, such as in the form of cross bottom valve sacks, can be fabricated from this type of tube segments. In the patent document DE 195 49 618 C2, it is shown how the ends of a piece of a tube are drawn up in the production this type of cross bottoms. However, various other types of sacks and bags are also known, which are produced with different types of devices. Thus, such devices are also known, with which the carry bags with handles are produced from paper sheets.

Even when the named documents are concerned mostly with paper sheets or tubes, the present invention is not limited to this material. Tube segments, bags or sacks made from plastic or from a combination of plastic and paper are also possible. Similarly, as mentioned at the beginning, the material can also consist of one or more layers.

The said tube segments, bags or sacks are normally stacked for the purpose of their transportation or storage. For stacking the products the known systems include a stacking device, as shown, for instance, in the patent document DE 37 07 845 C2. As a rule, these stacks are subsequently deposited on palettes in order to be able to transport them easily. However, the stacks can also be temporarily stored on or in temporary storages before they are arranged or deposited on storage elements. After stacking, and after their possible temporary storage, the stacks are arranged and deposited in storage elements.

The stacks made from tube segments, bags or sacks can be arranged and stacked in large numbers in a storage element, if the edges of the tube segments lie exactly one on top of the other in the individual stacks, which lie on one another. In the known systems, for production and palletizing, there is room for improvement potential in this regard. Moreover, the stacks are in general deposited manually in the storage elements. This procedure is slow and is ridden with immense inaccuracies, very personnel-intensive and hence expensive. On the whole, the procedures according to the present state of the technology for arranging and storing of the stacks are very ineffective.

Therefore the task posed by the present invention is to propose a system for production and subsequent palletizing of tube segments, bags or sacks, which avoids the aforesaid disadvantages.

SUMMARY OF THE INVENTION

This task is solved according to the features of the invention as described herein. According to that, the named system has an alignment unit for the stacks of the tube segments or sacks, which reduces the mutual deviation of the edges of the tube segments, bags or sacks. Therefore, the form of the stack in this alignment unit is better approximated to the parallelepiped form. Compared to the alignment by hand, it can be done much more exactly and also faster.

Since by using this type of equipment, the stack has—at least nearly—a parallelepiped shape, a stack generated by means of it can be picked up in a more advantageous manner by means of a palletizing device, which deposits the stacks in at least one storage element. In case of a stack with a shape that deviates to a great extent from parallelepiped shape, use of this type of palletizing device would not be possible, or the tube segments, bags or sacks may even get damaged in the stack. By using a palletizing device, many more stacks can be deposited on a storage element due to the more precise deposition of the stack, than when they are deposited manually. Stacks can slip or fall down if the stacks are arranged in the storage elements too inaccurately. Thus, by including a palletizing device in a system according to the invention, the transport and storage costs can be saved.

In an advantageous embodiment of the invention, the alignment unit has an alignment table, which is equipped with stoppers. The stack can be arranged on this alignment table independent of the entire system. Thus, the alignment table can, for instance, be moved separately. In this type of alignment table, two stoppers are provided. If the principal axis of the tube pieces, bags or sacks to be arranged is transversal to the direction of transport, it is of advantage if one stopper extends parallel to the principal axis of the tube pieces, bags or sacks, while the second stopper is parallel to the direction of the transport. Both stoppers therefore form a right angle. However, in general, the stoppers can be arranged along any two arbitrary lines, whereby both stoppers can form any angle.

It is also advantageous, if the alignment table is equipped with a means for inclining the stacks. This means for inclining can be, for example, conveyor belts, which transform the stack in a horizontal plane to an oblique plane. The oblique plane is then also a component of the alignment table, whereby this oblique plane can then be used for the alignment of the stacks. In which case, also the forces based on the gravitational force act on the tube sections, bags and sacks, which can lead to mutual displacement of the tube segments, bags and sacks.

However, it is especially advantageous, if the device for inclining the stack includes a swiveling device, with which the alignment table can be swiveled to such an extent that the stack is inclined against the gravitational force. After the swiveling movement the stack is inclined, so that the gravitational forces act on the tube sections, bags or sacks so that their edges lie against the stoppers.

The edges of each individual tube segment, bag or sack can come to rest against the stoppers. This leads to an almost optimum parallelepiped form of the stacks.

In an advantageous embodiment of the invention, the swivel axis, about which the swiveling device swivels the swiveling table, forms an angle with both stoppers. In a swiveling movement, each edge of the individual tube pieces, bags or sacks lie against each stopper, so that after this maneuver the tube pieces, sags or sack assume a well-defined spatial position. This alignment is particularly effective, if the swivel axis and each stopper enclose an angle of approx. 45 degrees. Depending on the format of the tube pieces, bags or sacks, a different angle can also be advantageous. If, for example, the length of a tube piece, bag or sack is twice its width, an angle of 30 degrees (between the longitudinal edge of the bag and the swivel axis) can be advantageous. In general, if one takes the longer edge of the tube piece, bag or sack, into consideration, then the swivel axis makes an angle between 0 and 45 degrees with this edge or with the stopper associated with that edge.

The stacks must be supplied to the alignment unit. Therefore, in a system according to the invention, a first transport device is provided, which includes transporting elements such as transport rollers or conveyor belts, which carries the stacks to and fro from the alignment table and a transport device. It is of advantage, if this transport device includes a transition element, which connects the transport device with the alignment table and which can be made to swivel or travel. A transport device with this type of design should be provided, especially if the swivel axis forms an angle with the stoppers and the swivel axis does not pass through the top of the alignment table, because in that case the range of swivel of the alignment table will sweep through the built design area of the transport device.

In a further development of the invention, the system is equipped with a second transport device for transporting the stacks onto the alignment table, which has a drive mechanism mounted with firm attachment with the frame and which is at rest during the swiveling movement of the table. This drive, which can be stationary, fixed on the machine frame, transmits the driving force to the transmission gear of the device, which, if the alignment or the swiveling table is not swiveled, is in active connection with the other driving force transmission devices. The first transmission device can be a disk, which is pressed with elastic force in the direction of the alignment table, so as to ensure optimum transmission of force. The other force transmission devices can be one or more shafts, on which the conveyor belts or conveyor straps are mounted.

It is of advantage to equip the arrangement table with a vibration-generating element. By generating vibrations with sufficient amplitude and appropriate frequency, the individual tube pieces, bags or sacks can move away from each other for a short period, so that the force of friction between them is reduced. Independent movement of the individual hose pieces, bags or sacks is thus facilitated. If the alignment table is swiveled, then the edges of each individual tube section, each individual bag or each individual sack can lie against the stoppers. Consequently, stack with almost perfect parallelepiped shape is generated easily.

In order to transform the shape of the stack into a parallelepiped shape, it can also be sufficient to provide a device for inclining the stack, which inclines the alignment table, already while it is in idle position, or keeps it in an inclined position, so that the stack is inclined at the time it is placed on the alignment table. The shape of the stack can be transformed into this form of embodiment according to the invention, for instance, on a slanting alignment table, so that the alignment takes place due to the influence of the gravitational force. After completing of this alignment process, the alignment table can be brought into a suitable position by means of the device for inclining, so that the stack can be transported away.

In another advantageous embodiment according to the invention, the alignment table comprises a vibration transmission element, which supports the stack at least from time to time and which can be impinged with vibrations by the vibration-generating element. Preferably, before impinging with the vibrations, the stack is lifted off from the conveyor element(s) with this vibration-transmitting element. The lowest tube piece, the lowest bag or the lowest sack is therefore not exposed to the static friction force, which acts between the conveyor element and this tube piece, bag or sack.

Thereby, it is advantageous if the vibration transmission element includes a carriage table that is built like a comb. In that embodiment, the carriage table can stand between the conveyor elements, such as for instance conveyor belts. For the purpose of aligning the stacks, the carriage table can be lifted up in such a way that the individual prongs of the comb of the carriage table rise forth between the conveyor belts and carry the stack alone. The number of prongs of the comb, and thus of the conveyor belts, must be dimensioned in such a fashion that the tube pieces, bags or sacks sag through as little as possible between the prongs of the comb.

It is also advantageous, if the vibration transmission element includes areas for deposition, on which the stacks can lie, which areas have lesser friction with the stack material than with the second transport device. The static friction between the areas for the deposition is thereby determined by the size of the areas of the deposition as well as also their coefficients of friction. The areas of deposition can therefore be lateral edges of the carriage elements built with a flat form. In order to achieve least possible coefficients of friction, these carriage elements can consist of metal. Further, the carriage elements can be provided with a suitable coating that offers, besides the low friction, also the advantage of greater protection against wear.

In a further advantageous embodiment of the invention, the alignment table is equipped with a device for clamping, with which the stack or the stacks can be held firmly on the alignment table. The parallelepiped-shaped stack, which was created shortly on the inclined or swiveling alignment table, should not lose its alignment again before the further transport. Due to that reason, one can fix the stack on the means of transport with the clamping device, till the individual sacks have assumed the horizontal position again. Only thereafter the pressing of the stack against the means of transport is ended again. In addition to that, the clamping device is brought in the vicinity of the stack or the stacks, so that the uppermost layers of the stack do not fall down or sag through during the vibration of the alignment table.

In an especially advantageous embodiment, the system according to the invention comprises at least two alignment tables. In that manner, the throughput of the alignment unit can be adjusted to the capacity of the other components of the system, in particular the production capacity of the function unit for production of the tube segments, bags or sacks.

Advantageous thereby is, if at least two alignment tables follow each other in the transport direction of the stack. With that the stack of the sacks can be transported sequentially, so that the transport devices within the system according to the invention can remain simple.

In an advantageous embodiment, the first alignment table, out of at least two alignment tables in the direction of transport of the stack, includes a second transport device, with which the stack can be transported from the first alignment table onto the second alignment table. Directly after a stack has been transported away through the first alignment table onto the second alignment table, the first alignment table can be impinged with another stack. In this manner each of the two alignment tables can align one or more stacks. In the same manner, the second alignment table, of the at least two alignment tables, can also have a transport device with which the stacks can be transported away from the first alignment table through the second alignment table.

For simultaneous alignment of the stacks on several alignment tables, it is advantageous, to swivel these swivel tables with the help of a swiveling device, whereby the swiveling movements of the alignment tables stand in mutual dependence by means of a coupling element. A single driving mechanism can thereby take care of the swiveling movement of all swivel tables, whereby the drive mechanism can act on a steering rod. The steering rod acts on its part on the swivel tables, so that they carry out same turning movement at the same time. With this, it is ensured that the swivel tables, which carry out the picking up movements, do not come into mutual contact during the swings.

In a further advantageous embodiment of the system according to the invention, a coupling between at least a part of the stoppers is provided, with which the stoppers can move from stop position relative to the alignment tables into a released position, in such a fashion that the stack can be transported past the stopper position, if the stoppers are in the released position. For that, the stopper, which is arranged transversally to the direction of the transport, consists of several individual elements, for instance, rods or pipes, which are supported rotatably at one end on a carriage element. Through a coupling element, the individual elements can be rotated together in direction transversal to the direction of the transport, so that they can be brought from the stopper position into the release position and vice versa. This type of movement is especially fast. Further, in the release position, the movable elements are arranged in an especially place saving manner, so that the design space can be saved on the whole. In addition to that, the stopper can be swung by a small angle into the direction of the transport, so that the stopper does not stand any more in contact with the stack. With that it is avoided, that the order of the stack brought into the parallelepiped form is not destroyed again.

BRIEF DESCRIPTION OF THE DRAWINGS

Further examples of embodiments of the invention follow from the description of the objects and the claims. The individual figures show:

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
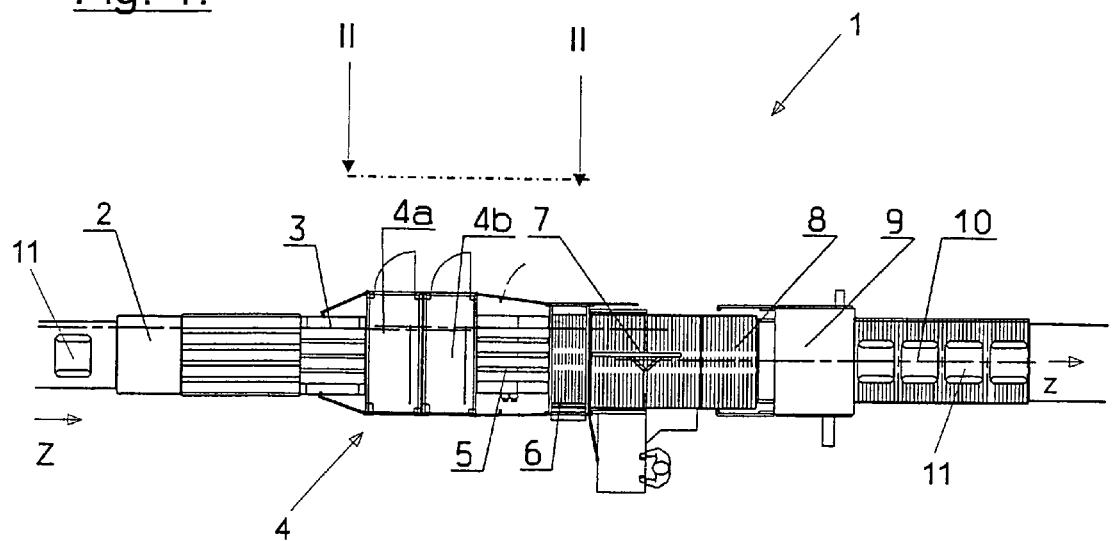
FIG. 1 A top view of a system according to the invention, for preparation and subsequent palletizing of tube segments, bag or sacks.

FIG. 1 shows a system according to the invention for manufacture and palletizing of tube segments, bags or sacks 1(in the following denoted as system in short). Due to the reasons of oversight, however, the devices for manufacture and for building stacks are now shown. The stack 11 of tube pieces, bags or sacks is fed into the direction of transport z through the transport belts 2, 3 of the alignment unit 4. This alignment unit 4 includes two alignment tables 4a, 4b, in which two stacks 11 can be aligned simultaneously. After the alignment, the stack 11 is fed through another transport belt 5 of a turning station 6 optional for this system 1, in which the stack 11 can be turned around. With the turning station 6, a control station 7 is connected, in which the quality of the stack 11 as well as of the stack constituents can be inspected. Through a transport device 8, the stacks 11 are fed into a stacking elevator 9, with which the stack 11 is conveyed practically in vertical direction. Finally, the stack 11 reaches the transport and storage belt 10, on which the stack is placed in an intermediate storage, till they are arranged on a palletizing device and stacks on pallets.

Figure 2:
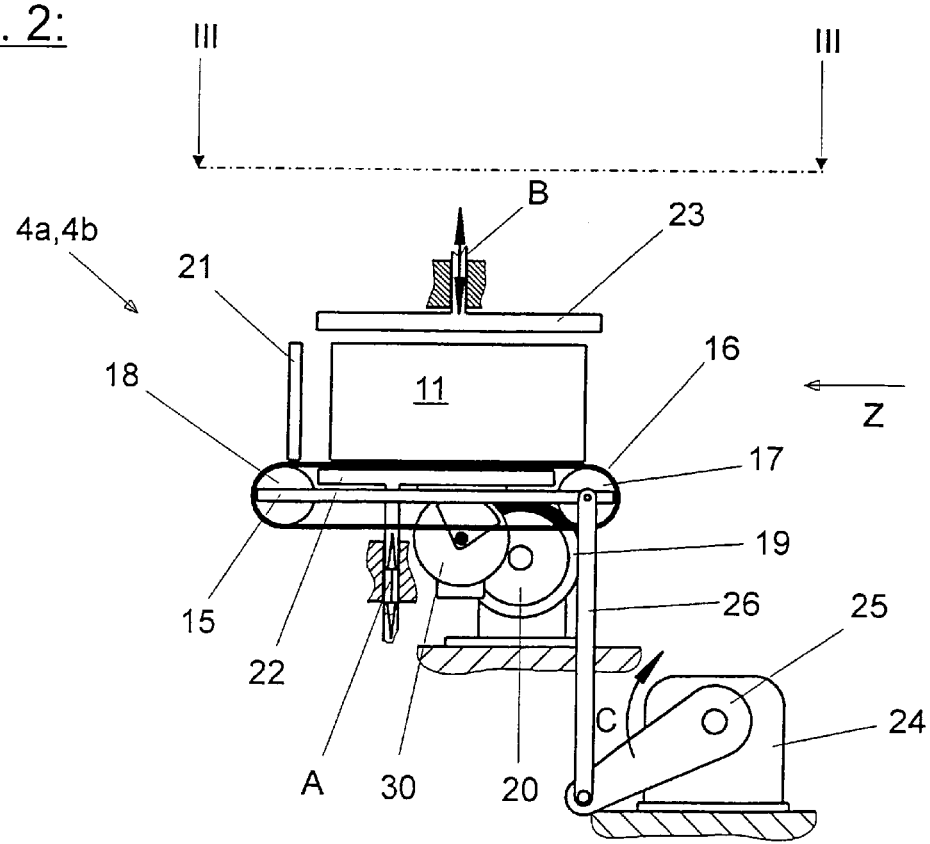
FIG. 2 Side view of a section of the alignment unit according to II-II in FIG. 1

The FIG. 2 shows the view II-II from FIG. 1, that is, a side view of an alignment table 4a or 4b. The alignment table 4a, 4b consists of a base frame 15, which is fixed with a swivel axis not shown in FIG. 2. In the base frame 15, a shaft 17 and several deflection sheaves 18 are supported rotatably, on which 17, 18 conveyance belts 16 are mounted. The shaft 17, and hence the conveyance belts 16, are driven by the driving mechanism 19, which turns the driving wheel 20. With the help of these conveyance belts 16, the stack 11 can be fed from and to the alignment table 4a, 4b as well as it can be moved on the alignment table 4a, 4b.

The stack 11, transported in the direction of the transport z, is conveyed so long by the conveyance belts 16, till it touches the stopper 21. This contact is detected by an appropriate, not further described, sensors. At that moment, the driving mechanism 19 is brought to halt. After that, the carriage table 22, which is built in the FIG. 3 in a comb-like form, is lifted in the direction of the double arrow A, so that the stack 11 and the conveyance belts 16 stand no longer in contact. The lifting drive of the carriage table 22, not shown here, is connected with the base frame 15 in an appropriate manner. Finally the clamping device 23 is moved along the double arrow B, in the direction of the stack 11, though, without touching this 11. The lifting path of the clamping device 23 can thereby be fixed automatically or it can be manually adjusted before the beginning of the production. The lifting drive, also not shown here, of the clamping device 23, is connected with the base frame 15 in an appropriate manner.

The swiveling mechanism 24 now moves the turning lever 25 in the direction of the arrow C. With the turning lever 25, a rod 26 is connected flexibly, which on its part is connected flexibly with the base frame 15. The movement of the turning lever 25 leads therefore to a swiveling movement of the base frame 15 of the alignment table 4a, 4b about the swivel axis 27. In that position, the alignment table 4a, 4b continues and the vibration mechanism 30, which can be an electromotor equipped with flyweight, sets the carriage tables 22 into vibrations. The stopper 21 and side lay 31 also can be set in vibrations through the vibration mechanism 30. In this manner, the individual tube pieces, bags or sacks of the stack 11 are lifted away from each other for a short period in such a manner that the frictional force is reduced between them. The individual tube pieces, bags or sacks can thus slide, independent of one another under the influence of the gravitational force, against the stopper 21 and also against the side lay 31 shown in FIG. 3, which is aligned essentially parallel to the direction of transport of the stack 11 and is arranged sideway by it. After the vibrations cease, this clamping device 23 is moved further in the direction of the stack, so that it is held between the carriage table and the clamping device 23 with clamping hold. After that, the turning lever 25 is moved by the swivel drive 24 opposite to the direction of the arrow C. After the release of the clamping device 23 from the stack 11, the lowering of the carriage table 22 and the turn away of the stopper 21 as explained below, the stack 11 can be removed from the alignment table 4a, 4b in the direction of transport z.

Figure 3:
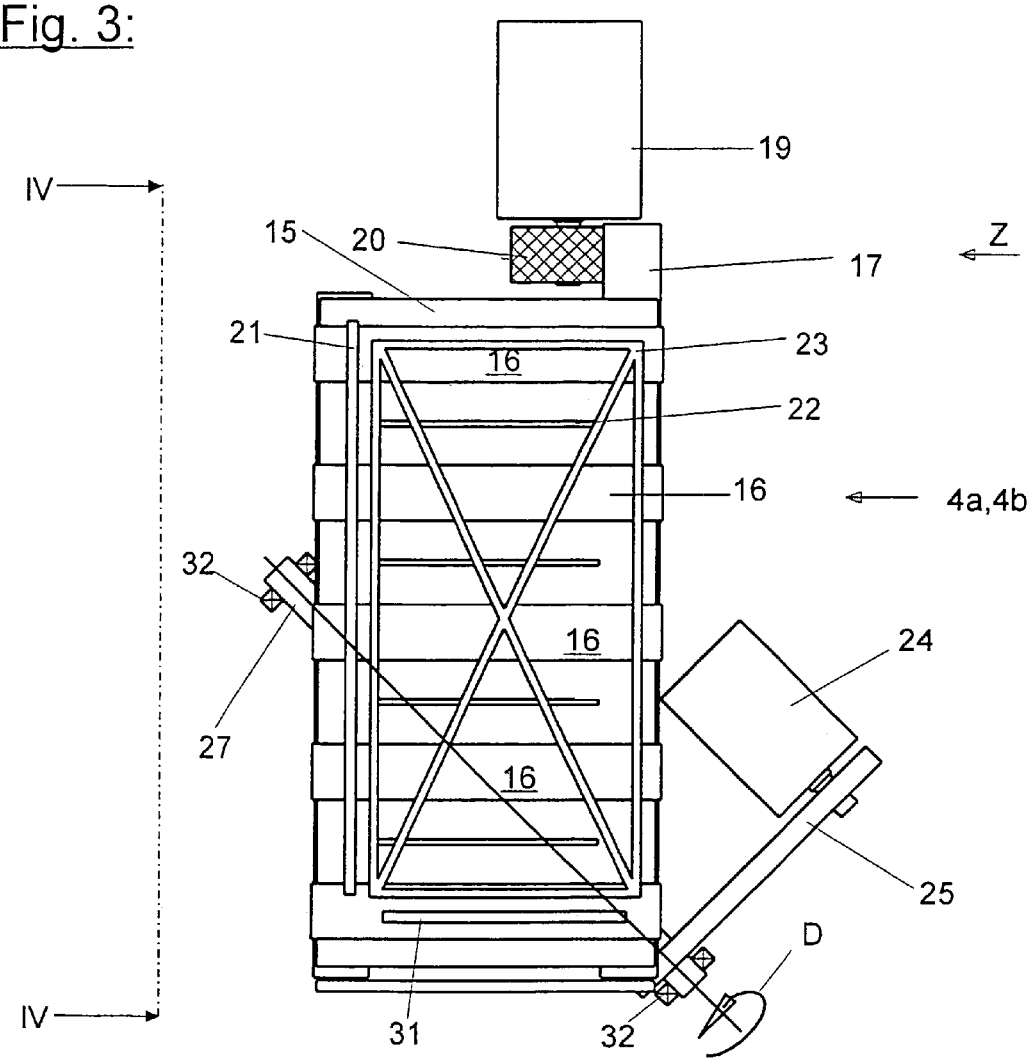
FIG. 3 Top view of an alignment table according to III-III in FIG. 2

FIG. 3 shows the view III-III in FIG. 2. In this top view of the alignment table 4a, 4b, one can recognize the swivel axis 27, which encompasses an angle with the stopper 21 and the side lay 31. The swivel axis 27 is supported rotatably by means of the bearings 32 on the machine frame, not shown here. Through the swiveling movement of the alignment table 4a, 4b in the direction of the arrow D, the shaft 17 is lifted from the driving wheel 20. Only if the alignment table 4a, 4b is in the rest position, the driving wheel 20 and the shaft 17 are in a friction-tight active connection. A movement against the direction of the arrow D brings the alignment table 4a again into its initial position.

Figure 4:
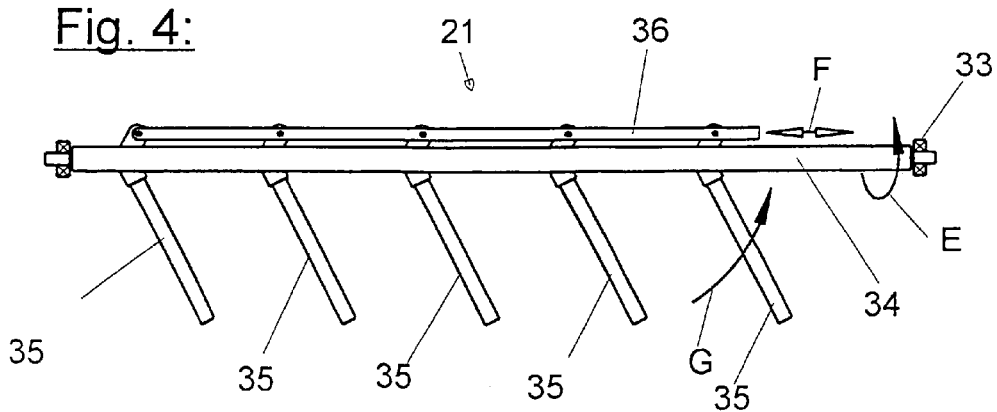
FIG. 4 A view of the stopper according to IV-IV in FIG. 3

FIG. 4 shows a detailed view of the stopper 21 according to view IV-IV in FIG. 3. Shown is the stopper position of the stopper 21. In order to bring the stopper elements 35, which can have a pin or a pipe like form, of the stopper 21 into release position, in which the stack 11 can be transported through under the stopper, at first the stay bar 34, which is connected rotatably by means of the bearings 33 with the base frame 15, rotates by a small angle in the direction of the arrow E, till the stopper elements 35 no longer touch the stack 11. Now, the steering rod 36 is moved by a suitable driving mechanism in the direction of the arrow F. Since the stopper elements 35 are connected flexibly with the steering rod 36 as well as with the stay bar 34, the movement of the steering rod 36 leads to a turning movement of the stopper elements 35 in the direction of the arrow G. Reaching the end position of the stopper elements 35 can be monitored by means of a suitable sensor or it can be restricted mechanically through stoppers or puffer. It is obvious that the movements bring the stopper 21 again in its starting position against the arrow directions E, F, G.

Figure 5:
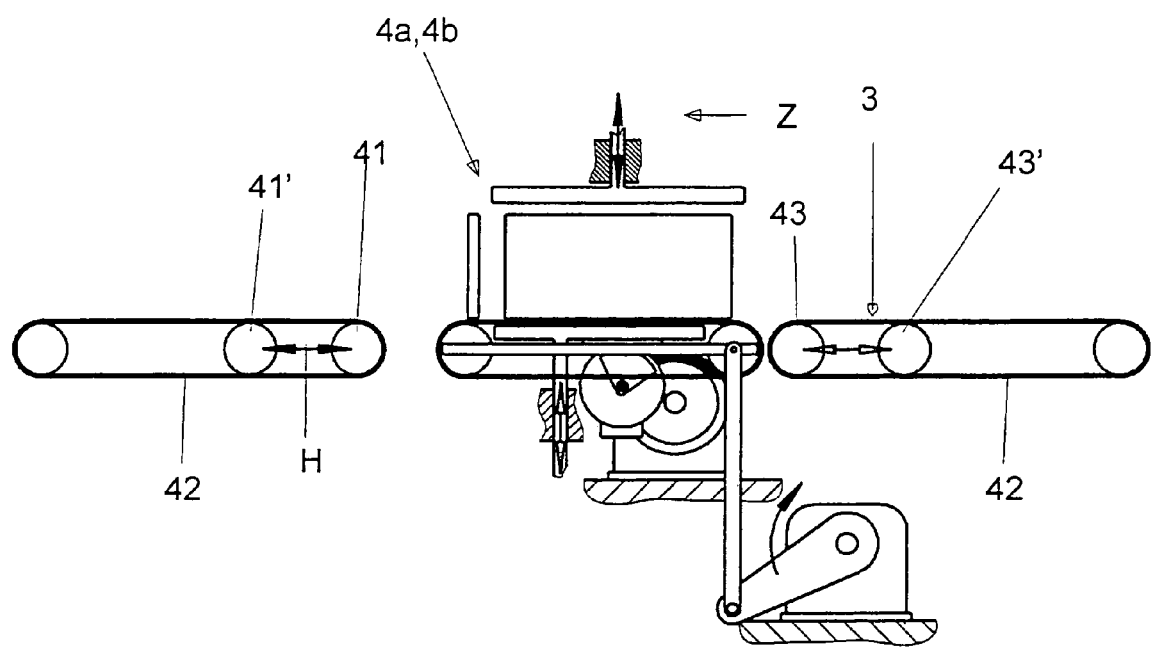
FIG. 5 Side view of a section of the system according to II-II in FIG. 1.

FIG. 5 shows a side view of an alignment unit 4 with an alignment table 4a, 4b, the conveyor belt 3 feeding the stack and the transporter belt 5, which conveys the stack away. Since the swivel axis 27 of the alignment table 4a, 4b projects into the design space of the transporter belt 5 due to the situation as shown in FIG. 3, the deflection sheaves 41, which guide or drive the transport belts 42, are moved in the direction of transport z (see double arrow H) up to the position 41', so that the transporter belt no longer projects into the sweep area of the alignment table. At the same time, the deflection sheaves 43 of the conveyor belt 3 can be brought against the transport direction z into the position 43'.

After completion of the alignment of the stack 11, the deflection sheaves 41, 43 are brought back again into their original position for the purpose of the transport of the aligned stack 11 or for feeding a stack 11 to be aligned.

For the alignment of stacks of other flat objects—such as paper sheets—the features of the preceding description and/or of the claims can be used with advantage.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

List of Reference Symbols

| | |
|---|---|
| 1 | System for production and palletizing of tube segments, bags and sacks |
| 2 | Conveyor belt |
| 3 | Conveyor belt |
| 4 | Alignment unit |
| 4a, 4b | Alignment table |
| 5 | Transporter belt |
| 6 | Turning system |
| 7 | Control station |
| 8 | Transport device |
| 9 | Stacking elevator |
| 10 | Transport and storage belt |
| 11 | Stack from tube segments, bags and sacks |
| 12 | |
| 13 | |
| 14 | |
| 15 | Base frame |
| 16 | Conveyor belts |
| 17 | Shaft |
| 18 | Deflection sheave |
| 19 | Driving mechanism |
| 20 | Driving wheel |
| 21 | Stopper |
| 22 | Carriage table |
| 23 | Clamping device |
| 24 | Swivel drive |
| 25 | Turning lever |
| 26 | Lever |
| 27 | Swivel axis |
| 28 | |
| 29 | |
| 30 | Vibration drive mechanism |
| 31 | Side lay |
| 32 | Bearings |
| 33 | Bearings |
| 34 | Stay bar |
| 35 | Stopper elements |
| 36 | Coupling elements |
| 37 | |
| 38 | |
| 39 | |
| 40 | |
| 41 | Deflection sheaves |
| 41' | Deflection sheaves |
| 42 | Transport belt |
| 43 | Deflection sheaves |
| 43' | Deflection sheaves |
| 44 | |
| Z | Direction of transport of stack 11 |
| A | Direction of movement of carriage table 22 |
| B | Direction of movement of clamping plate 23 |
| C | Direction of movement of turning lever 25 |
| D | Direction of movement of swivel axis 27 |
| E | Direction of movement of stay bar 34 |
| F | Direction of movement of steering rod 36 |
| G | Direction of movement of stopper elements 35 |
| H | Direction of movement of deflection sheaves 41, 41', 43, 43' |

What is claimed is:

1. A system for production and subsequent palletizing of tube segments, bags, or sacks, comprising:

at least one functional unit that produces the tube segments, bags, or sacks;

at least one device that deposits and stacks the produced tube segments, bags, or sacks;

at least one storage element in which the stack is deposited; at least one stack transport device that transport the stack; and after "is deposited;"

at least one alignment unit that aligns the stack of the tube segments, bags, or sacks so as to reduce mutual deviations of edges of the tube segments, bags, or sacks, the alignment unit including an alignment device having a vibration generation element and a vibration transmission element, the vibration transmission element having a carriage frame configured to be impinged by the vibration generation element with vibrations and having a comb the carriage frame being configured to elevate above the stack transport device so as to support and align the stack.

2. The system according to claim 1 further comprising at least one palletizing device which deposits the stack on the at least one storage element.

3. The system according to claim 1 wherein the alignment device includes stoppers.

4. The system according to claim 3 wherein at least one part of the stoppers is coupled such that the stoppers are movable from a stopping position relative to the alignment device into a release position so that the stack is transported past the stopping position if the stoppers are in the release position.

5. The system according to claim 1 wherein the alignment device includes a device that tilts the stack.

6. The system according to claim 5 wherein the device that tilts the stack includes a swiveling device with which the alignment device can be swiveled such that the stack is inclined against a gravitational force.

7. The system according to claim 5 wherein the device that tilts the stack inclines the alignment device or holds the alignment device in a tilted position so that the stack is inclined when it takes a position on the alignment device.

8. The system according to claim 6 wherein a swivel axis about which the swiveling device swivels the alignment device forms an angle with the stoppers.

9. The system according to claim 1 wherein the transport device has conveyor elements and transport rollers which transport the stack into or out of the alignment device in a transport direction (z) and has a transition element which connects the transport device with the alignment device and which can swivel and travel.

10. The system according to claim 9 further comprising a second transport device that conveys the stack on the alignment device, the second transport device including a drive which is mounted on a stand and which remains idle during the swiveling movement of the alignment device.

11. The system according to claim 10 wherein the vibration transmission element includes areas for deposition on which the stacks are brought to lie, the area of deposition having a lesser amount of friction with the stacked material as compared to the second transport device.

12. The system according to claim 1 wherein the alignment device has a clamping device with which the stack can be firmly held on the alignment device.

13. The system according to claim 1 further comprising at least a second alignment device.

14. The system according to claim 13 wherein the at least two alignment devices are configured in consecutive succession in a direction of transport (z) of the stack.

15. The system according to claim 14 wherein a first of the at least two alignment devices in the direction of transport (z) of the stack has a transport device with which the stack is transported from the first alignment device to the second alignment device.

16. The system according to claim 14 wherein the at least two alignment devices swivel in mutual dependence through a coupling element.

* * * * *